Patented Feb. 11, 1936

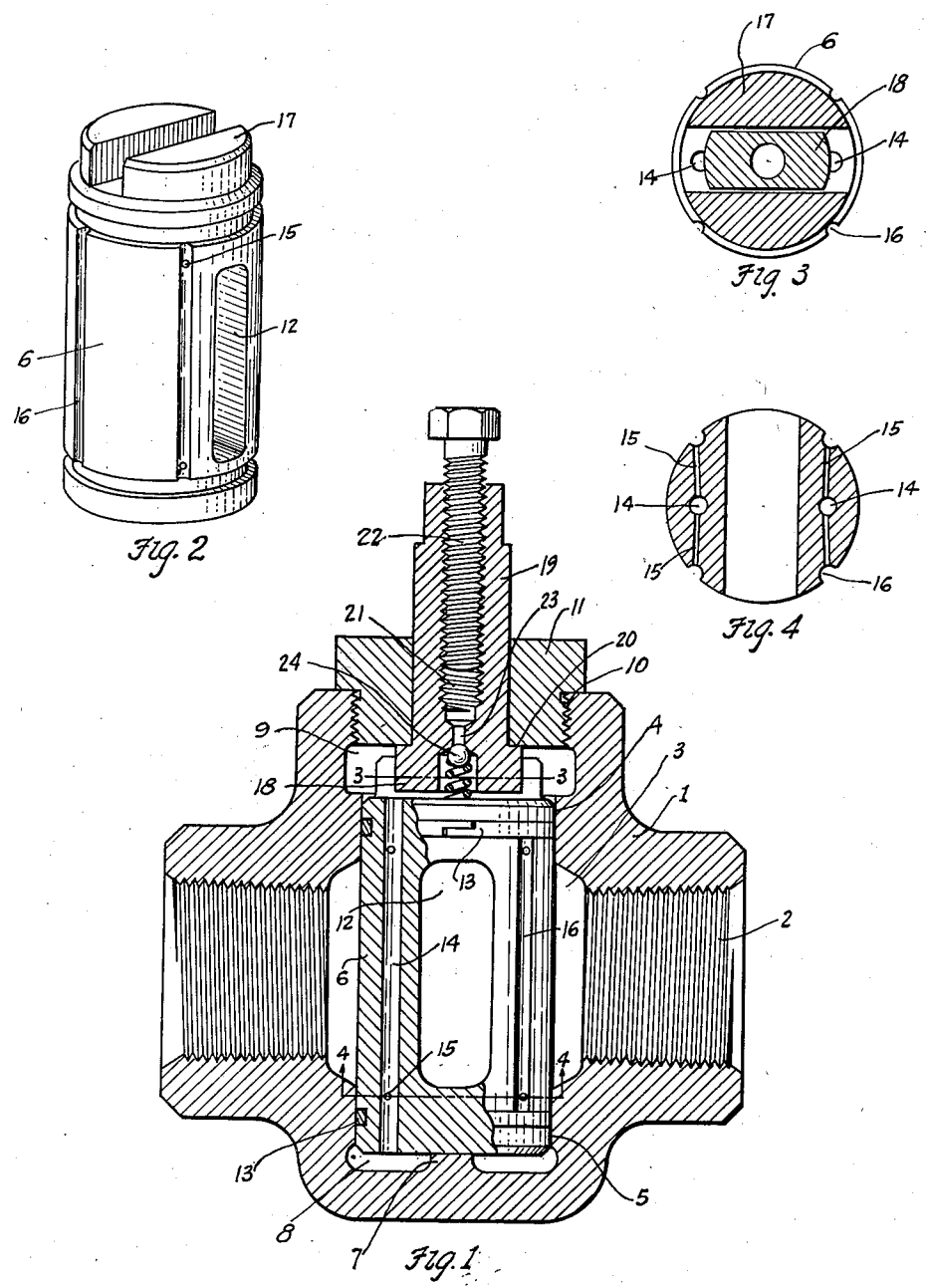

2,030,408

UNITED STATES PATENT OFFICE 2,030,408

LUBRICATED PLUG VALVE

Ralph P. Sherman, Houston, Tex., assignor to Hughes Tool Company, Houston, Tex., a corporation of Texas Application March 24, 1932, Serial No. 600,902

3 Claims. (Cl. 251—93)

The invention relates to valves for high pressure lines and particularly to valves employing a rotatable plug or core.

In plug valves it is common to employ lubricant about the plug to assist in forming a seal, to prevent sticking of the plug, and also to allow moving of the plug longitudinally, or for balancing the same. Where the valve is used in lines carrying excessively high pressure the plug is moved more tightly against the downstream side of the housing, so that it is difficult to lubricate the area about the downstream side of the plug. Also leakage of lubricant along the upstream side is likely to occur.

It is an object of my invention to provide a valve structure of this character whereby the lubricant can be more evenly distributed about the plug under high pressures.

I desire to prevent undue loss of lubricant on the upstream side and to sufficiently lubricate the downstream side of the plug in high pressure lines.

I also desire to feed lubricant to both ends of the valve plug under pressure so as to evenly balance the plug in the housing longitudinally of the plug.

In the drawing I have shown for purposes of illustration a preferred form of my invention.

Fig. 1 is a central vertical section through a plug valve employing therein my present improvement.

Fig. 2 is a perspective view of the valve plug, removed.

Fig. 3 is a transverse section on the plane 3—3 of Fig. 1.

Fig. 4 is a transverse section on the plane 4—4 of Fig. 1.

The housing I of my valve is a cross-shaped fitting having a fluid passage therethrough and having its ends threaded at 2 for engagement in a flow line. Transversely of this passage is the valve chamber 3 which is made cylindrical at 4 and 5 on each side of the passage to make a close rotating fit with the valve plug 6.

The recess 5 is closed about the lower end of the plug and a central post 7 is formed on the wall of said recess to limit the movement of the plug downwardly. The space at 8 is to receive lubricant, as will be noted.

At the upper end of the plug the recess is enlarged to provide a chamber 9 the outer side of which is threaded at 10 to receive the screw plug or gland 11.

The valve plug is cylindrical and has a diametrical passage 12 therethrough adapted to be brought into and out of registration with the passage through the housing. Adjacent each end, the outer periphery of the plug is formed with an annular recess to receive the packing rings 13, preferably of metal similar to the usual piston ring.

Longitudinally of the plug, I provide two opposite bores or passages 14 through which lubricant may pass from the upper chamber 9 to the space 8 at the lower end. Each of these passages has small ducts 15 connecting therewith at points leading to the areas 4 and 5 so as to conduct lubricant to the bearing surfaces of the plug. The outer ends of said ducts 15 terminate in longitudinal channels 16 in the plug, said channels extending from the upper packing ring 13 to the lower one.

The upper end of the plug 6 has two upstanding lugs 17 thereon (see Fig. 2) between which the lower end 18 of the valve stem 19 projects. Said stem is flattened at its said lower end to form a wrench head loosely engaging said plug to rotate same. Said valve stem 19 bears within a cylindrical opening in the screw plug 11; and below said screw plug a shoulder 20 on the stem makes a sealing contact with the lower side of said screw plug.

Said valve stem is formed with a longitudinal threaded chamber 21 therein to contain lubricant. A screw plug 22 therein serves as a means to compress lubricant in said chamber and force it through a passage 23, past a valve 24 to the chamber 9 at the upper end of said valve.

It will be seen that the valve plug will be subjected to the pressure of the lubricant at both ends so that it will be approximately balanced. The lubricant will be fed slowly through the small ducts 15 to the channels 16 on the outer surface of the plug. These channels feed the lubricant to the outer surfaces of the plug. On the upstream side of the plug where the plug fits its seat more loosely the lubricant will not leak away rapidly because of the small amount of the stiff lubricant which will be able to pass through the ducts 15 during any period of time. On the other hand a sufficient amount will be forced out upon the downstream side of the plug to prevent its sticking and to preserve the seal at that side.

I thus have provided a valve of simple construction which is easily operated and which will not stick. It is freely lubricated and evenly balanced so that it may be readily operated without difficulty.

What I claim as new is:

1. A plug valve including a housing, a fluid passage therethrough, a cylindrical plug rotatable in said passage and having a transverse fluid opening therein, peripheral packing rings adjacent each end of said plug, lubricant channels longitudinally of the outer surface of said plug terminating at said rings, means to conduct lubricant to both ends of said plug and approximately balance said plug longitudinally in said housing, and means to force lubricant slowly to said channels.

2. A plug valve including a housing, a fluid passage therethrough, a cylindrical plug having a fluid opening to be brought into alignment with said passage by rotation of said plug, packing rings adjacent each end of said plug, channels longitudinally of said plug terminating at said rings, lubricant chambers at each end of said plug, a stem loosely engaging said plug, means therein to force lubricant to said chambers, and comparatively small ducts forming connecting passages in said plug from said lubricant feeding means to said channels.

3. A plug valve including a housing, a cylindrical plug controlling the passage of fluid through said housing, said plug having circumferential recesses spaced from each end thereof, packing rings in said recesses, lubricant channels in the outer surface of said plug connecting said recesses, lubricant passages extending longitudinally through said plug, small ducts connecting said lubricant passages with said channels, chambers in said housing at each end of said plug, means to force lubricant under pressure into said chambers, and means to rotate said plug.

RALPH P. SHERMAN.